United States Patent [19]

Blaser et al.

[11] Patent Number: 5,272,402
[45] Date of Patent: Dec. 21, 1993

[54] ELECTRICAL MACHINE WITH DEVICE FOR DETECTING ROTOR POSITION AND ROTATIONAL SPEED

[75] Inventors: Peter T. Blaser, Dielheim; Jürgen Maass, Wiesloch, both of Fed. Rep. of Germany

[73] Assignee: Heidelberger Druckmaschinen AG, Heidelberg, Fed. Rep. of Germany

[21] Appl. No.: 900,327

[22] Filed: Jun. 18, 1992

[30] Foreign Application Priority Data

Jun. 18, 1991 [DE] Fed. Rep. of Germany ....... 4120023

[51] Int. Cl.5 ............................................ H02K 11/00
[52] U.S. Cl. .................................................. 310/68 B
[58] Field of Search ................ 310/68 B, 67 R, 68 R, 310/89, 173, 233, DIG. 6

[56] References Cited

U.S. PATENT DOCUMENTS

| | | |
|---|---|---|
| 4,162,399 | 7/1979 | Hudson . |
| 4,642,496 | 2/1987 | Kerviel et al. ...................... 310/68 B |
| 4,862,044 | 8/1989 | Karashima et al. ................. 318/254 |
| 4,988,905 | 1/1991 | Tolmie, Jr. ......................... 310/68 B |
| 5,049,769 | 9/1991 | Reinhardt et al. ............ 310/68 B X |
| 5,124,602 | 6/1992 | Nishimura et al. ................ 310/68 B |

FOREIGN PATENT DOCUMENTS 1269033 11/1986 U.S.S.R. ............................ 310/68 B

Primary Examiner—Steven L. Stephan
Assistant Examiner—E. To
Attorney, Agent, or Firm—Herbert L. Lerner; Laurence A. Greenberg

[57] ABSTRACT

An electrical machine includes a motor having a motor housing and a stator and a rotor received in the housing, and a device for detecting rotor position and rotational speed disposed outside the motor housing on a motor shaft carrying the rotor, the device being fixed to the motor housing.

4 Claims, 3 Drawing Sheets

ELECTRICAL MACHINE WITH DEVICE FOR DETECTING ROTOR POSITION AND ROTATIONAL SPEED

The invention relates to an electrical machine and, more particularly, to such an electrical machine having a brushless direct-current motor, especially, with a motor housing, a rotor, and a stator, and a device for electronically detecting rotor position and rotational speed.

In heretofore known electrical machines of the foregoing general type, the means required for effecting commutation, such as Hall-magnet fork-type barriers, are integrated directly into the motors. Such conventional constructions exhibit the following deficiencies. The means required for effecting commutation can be used only for specific motors and not for motors in general. Commutation and rotational-speed detection are not united in one device. If electronic components, especially, were to fail, they are difficult to replace. If replacement becomes necessary, time-consuming and difficult recalibration is required.

It is accordingly an object of the invention to provide an electrical machine, such as of the brushless type, with a device for commutation and rotational-speed detection which is easy to replace and, upon initial installation, requires just a one-time calibration, and no further calibration when replaced, this device also being usable for any motor of the respective type.

With the foregoing and other objects in view, there is provided, in accordance with the invention, an electrical machine, comprising a motor having a motor housing and a stator and a rotor received in the housing, and a device for detecting rotor position and rotational speed disposed outside the motor housing on a motor shaft carrying the rotor, the device being fixed to the motor housing.

Due to the compact construction of the electrical machine according to the invention, whereby the device required for commutation and rotational-speed detection is compactly installed in a housing, and the housing is replaceably attached directly to the outside of the motor, it is readily possible to replace such a device in relatively short time.

In accordance with another feature of the invention, the device comprises a calibration ring, a rotary part carried by the motor shaft and a transmitter securable to the calibration ring.

In accordance with a further feature of the invention, the calibration ring is firmly connected to the motor housing.

In accordance with an added feature of the invention, the calibration ring has a circumferential region formed with slots for calibration.

Due to the construction of the calibration ring, it is possible, upon initial installation thereof, to attach it to the motor housing with only a single calibration.

In accordance with an additional feature of the invention, the rotary part comprises a pulse cup having a plurality of lamellae or segments for detecting rotor position, and a pulse drum formed with slits for detecting rotational speed, the rotary part being fixed to the motor shaft.

The rotary part is fixed, for example, through the intermediary of a feather key, to the shaft of the motor. The rotary part carries, at one end thereof, a pulse cup formed with segments or lamellae and serving to detect the position of the rotor. At the other end thereof, the rotary part has a pulse drum formed with slits increments for measuring the rotational speed of the rotor.

In accordance with yet another feature of the invention, the transmitter comprises a housing releasably fixable to the calibration ring, and includes an electronic printed circuit board with electronic components received in the transmitter housing for detecting rotor position and for measuring rotational speed.

The calibration ring is fixed to the motor housing. The housing of the transmitter is screwed onto the calibration ring. If it is necessary to replace the electronic components located in the housing, the housing is merely removed from the calibration ring and a new housing with electronic components is mounted in position. This permits replacement without further calibration.

In accordance with yet a further feature of the invention, the calibration ring is formed with a locking element, and the housing of the transmitter is formed with a recess at a circumferential location thereof, the locking element of the calibrating ring being positively engageable in the recess formed in the transmitter housing for calibrating the transmitter.

In accordance with yet an added feature of the invention, there are provided Hall-magnet fork-type barriers for detecting rotor position arranged on the electronic printed circuit board, and the rotary part comprises a pulse cup having a plurality of lamellae or segments for detecting rotor position, the Hall-magnet fork-type barriers being in cooperative relationship with the segments of the pulse cup.

In accordance with a concomitant feature of the invention, there are provided light barriers for measuring rotational speed of the rotor arranged on the electronic printed circuit board, and wherein the rotary part comprises a pulse drum formed with slots for detecting rotational speed of the rotor, the light barriers being in cooperative relationship with the slits formed in the pulse drum.

The advantages derived from the invention are, particularly that components which are generally prone to failure (particularly the electronics) can be replaced in a selectively simple manner and in a short time without requiring re-calibration.

Other features which are considered as characteristic for the invention are set forth in the appended claims.

Although the invention is illustrated and described herein as embodied in an electrical machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
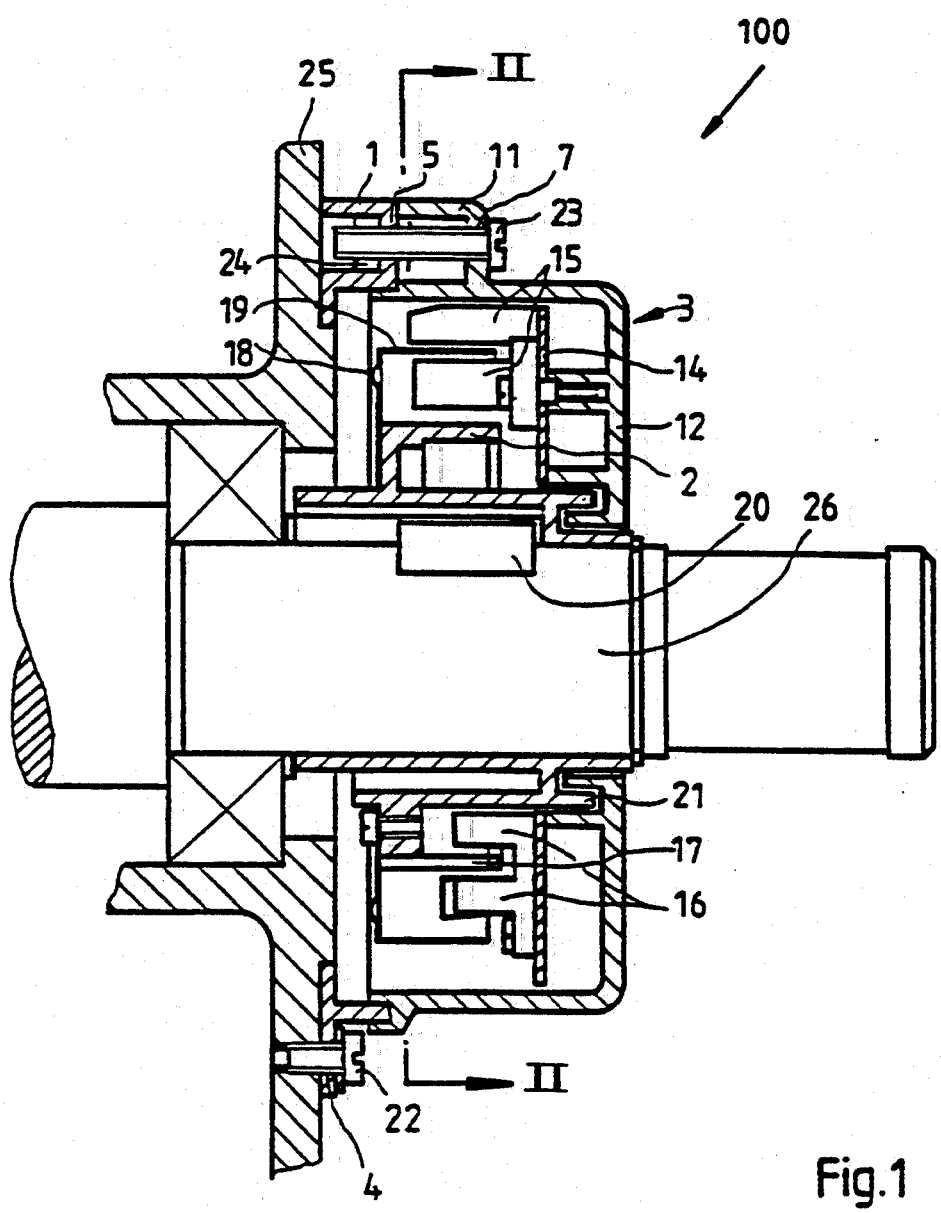
FIG. 1 is a longitudinal sectional view of a commutation device for an electrical machine according to the invention.

Referring now to the drawings and, first, particularly to FIG. 1 thereof, there is shown therein a motor shaft 26 with a motor housing 25. A commutation device 100 according to the invention is disposed outside the motor. It is formed of a calibration ring 1, a rotor part 2 and a transmitter 3. The calibration ring 1 is firmly connected to the motor housing 25 by bolts 22 which extend through slots 4 formed in the calibration ring 1. The housing 12 of the transmitter 3 is disposed on the calibration ring 1 and has several extensions 11, which are formed with bores 7. The housing 12 is secured to the calibration ring 1 by bolts 23. For this purpose, the calibration ring 1 is formed with bores 5 as well as indentations into which hexagon nuts 24, for example, are introduced. An electronic printed circuit board or card 14 carries Hall-magnet fork-type barriers 15 required for position detection, as well as light barriers 16 and 16' (FIG. 2), only one of which, namely the light barrier 16 is shown in FIG. 1. The light barriers 16 and 16' are provided for effecting rotational-speed measurements. An inner rotor part 21 is secured to the motor shaft 26 by a feather or woodruff key 20, for example. Essential components of the inner rotor part 21 are a pulse drum 17 and a pulse cup 18. The pulse cup 18 is preferably formed of sheet steel and is made up of, preferably, three lamellae or segments 19, which move through the Hall-magnet fork-type barriers 15. The pulse drum 17 is formed with a multiplicity of slits (increments), preferably one hundred twenty-eight thereof, which move through the light barriers 16 and 16'.

Figure 2:
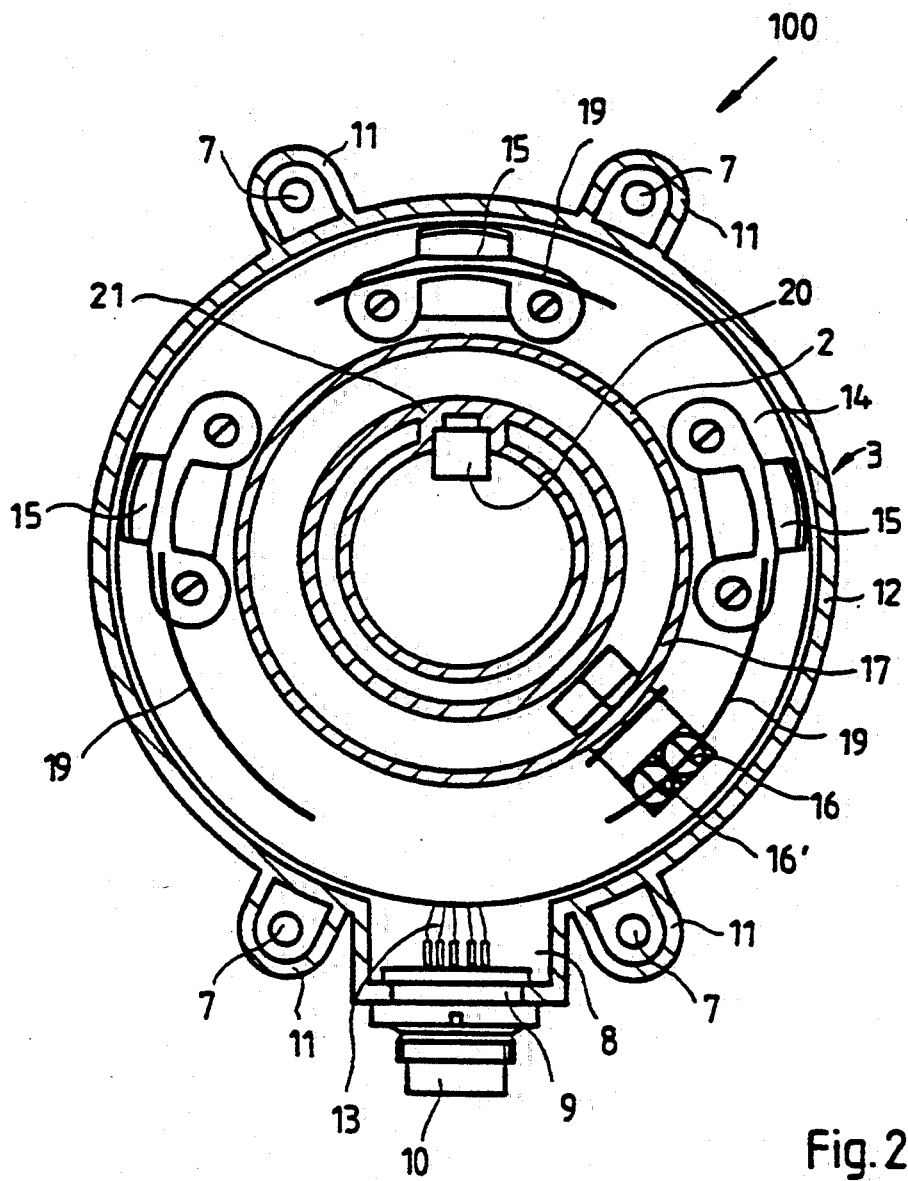
FIG. 2 is a cross-sectional view of FIG. 1 taken along the line II—II in the direction of the arrows.

FIG. 2 is a cross-sectional view of the device 100 according to the invention, with the calibration ring 1 thereof omitted. The reference characters shown in FIG. 2 identify the same features similarly identified in FIG. 1. In addition, a plug 10 is shown extending through a leadthrough 9 thereof. The plug 10 is connected to lines or leads 13 which lead to the electronics on the electronic printed circuit board or card 14. As noted hereinbefore, a second light barrier 16' is additionally provided and illustrated in FIG. 2. The light barriers 16 and 16' are electrically phase-displaced, preferably by 90°, in order to receive one signal for each light barrier, i.e., a total of two signals which are phase-displaced with respect to one another. By suitably combining the signals, a doubling of the pulses may be obtained. It is also possible to employ a greater or lesser number of fork-type light barriers and Hall-magnet barriers, respectively (depending upon the motor).

Figure 3:
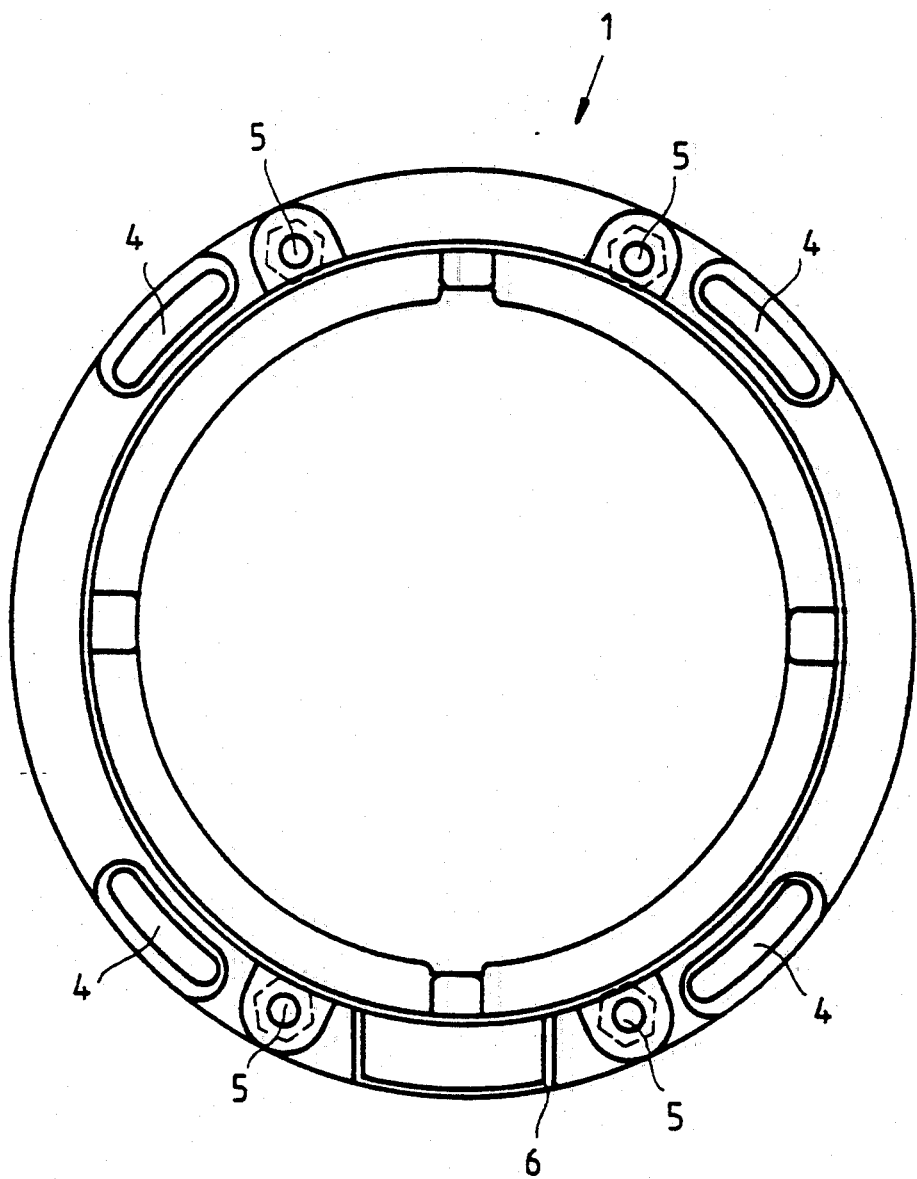
FIG. 3 is an elevational view of a calibration ring forming part of the invention.

In addition to the slots 4 required for calibration, which, for example, extend over a region of +/−8°, the calibration ring 1 shown in FIG. 3 is formed with a locking element 6 of such shape that it firmly engages in a recess 8 formed in the transmitter housing 12 (FIG. 2) with zero play.

A further embodiment of the invention is likewise conceivable wherein the transmitter is of such construction that the Hall-magnet fork-type barriers or the light barriers are disposed on the inner circumference or periphery of the transmitter housing, and are pointed in the direction of the rotor axis. In this case, the segments or lamellae and the slits, respectively, required for this purpose are disposed on disc-shaped bodies which move through the Hall-magnet fork-type barriers and the light barriers, respectively. The segments or lamellae and the slits, respectively, may be suitably provided either on two different disks or on one disk.

We claim:

1. Electrical machine, comprising a motor having a motor housing and a stator and a rotor received in said housing, and a device for detecting rotor position and rotational speed disposed outside said motor housing on a motor shaft carrying said rotor, said device, being fixed to said motor housing and comprising a calibration ring, a rotary part carried by said motor shaft and a transmitter securable to said calibration ring, said calibration ring being firmly connected to said motor housing and having a circumferential region formed with slots for calibration, said transmitter comprising a housing releasably fixable to said calibration ring and including an electronic printed circuit board with electronic components received in said transmitter housing for detecting rotor position and for measuring rotational speed, said calibration ring being formed with a locking element, and said housing of said transmitter being formed with a recess at a circumferential location thereof, said locking element of said calibrating ring being positively engageable in said recess formed in said transmitter housing for calibrating said transmitter.

2. Electrical machine according to claim 1, wherein said rotary part comprises a pulse cup having a plurality of lamellae or segments for detecting rotor position, and a pulse drum formed with slits for detecting rotational speed, said rotary part being fixed to said motor shaft.

3. Electrical machine according to claim 1, including Hall-magnet fork-type barriers for detecting rotor position arranged on said electronic printed circuit board, and wherein said rotary part comprises a pulse cup having a plurality of lamellae or segments for detecting rotor position, said Hall-magnet fork-type barriers being in cooperative relationship with said segments of said pulse cup.

4. Electrical machine according to claim 1, including light barriers for measuring rotational speed of the rotor arranged on said electronic printed circuit board, and wherein said rotary part comprises a pulse drum formed with slots for detecting rotational speed of said rotor, said light barriers being in cooperative relationship with said slits formed in said pulse drum.

* * * * *